(12) United States Patent
Yasukawa et al.

(10) Patent No.: US 10,075,975 B2
(45) Date of Patent: Sep. 11, 2018

(54) RADIO BASE STATION, USER TERMINAL AND RADIO COMMUNICATION METHOD

(71) Applicant: NTT DOCOMO, INC., Tokyo (JP)

(72) Inventors: Shimpei Yasukawa, Tokyo (JP); Qin Mu, Beijing (CN); Liu Liu, Beijing (CN); Lan Chen, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 93 days.

(21) Appl. No.: 15/024,861

(22) PCT Filed: Sep. 10, 2014

(86) PCT No.: PCT/JP2014/073884
§ 371 (c)(1),
(2) Date: Mar. 25, 2016

(87) PCT Pub. No.: WO2015/045865
PCT Pub. Date: Apr. 2, 2015

(65) Prior Publication Data
US 2016/0242207 A1   Aug. 18, 2016

(30) Foreign Application Priority Data

Sep. 26, 2013   (JP) .................................. 2013-199188

(51) Int. Cl.
*H04W 74/00*   (2009.01)
*H04W 72/04*   (2009.01)
(Continued)

(52) U.S. Cl.
CPC .........  *H04W 74/002* (2013.01); *H04W 28/06* (2013.01); *H04W 72/042* (2013.01);
(Continued)

(58) Field of Classification Search
CPC ........... H04W 74/002; H04W 72/1289; H04W 28/06; H04W 72/0413; H04W 72/042; H04W 88/02; H04W 88/08
See application file for complete search history.

(56) References Cited

U.S. PATENT DOCUMENTS 8,542,605 B2   9/2013   Chen et al.
8,634,374 B2   1/2014   Yang et al.
(Continued)

FOREIGN PATENT DOCUMENTS

JP   2013509047 A   3/2013
JP   2013514717 A   4/2013
(Continued)

OTHER PUBLICATIONS

International Search Report issued in corresponding application No. PCT/JP2014/073884 dated Dec. 9, 2014 (4 pages).
(Continued)

*Primary Examiner* — Pao Sinkantarakorn
*Assistant Examiner* — Kabir Jahangir
(74) *Attorney, Agent, or Firm* — Osha Liang LLP

(57) ABSTRACT

The present invention is designed so that communication overhead pertaining to control signals is reduced in a communication system in which the bandwidth of a physical downlink shared channel is narrower than the system bandwidth. The radio base station of the present invention has a resource allocation section that allocates a physical downlink shared channel to a predetermined narrow band in a downlink system bandwidth, for a user terminal, and a downlink control information generating section that generates downlink control information to report to the user terminal, and the downlink control information generating section determines the size of a field pertaining to resource allocation information, included in downlink control infor- (Continued)

mation related to the physical downlink shared channel, based on the narrow band where the physical downlink shared channel is allocated.

10 Claims, 18 Drawing Sheets

(51) Int. Cl.
*H04W 28/06* (2009.01)
*H04W 72/12* (2009.01)
*H04W 88/02* (2009.01)
*H04W 88/08* (2009.01)

(52) U.S. Cl.
CPC ... *H04W 72/0413* (2013.01); *H04W 72/1289* (2013.01); *H04W 88/02* (2013.01); *H04W 88/08* (2013.01)

(56) References Cited

U.S. PATENT DOCUMENTS

| | | | |
|---|---|---|---|
| 2012/0044899 A1* | 2/2012 | Kwon | H04L 5/001 370/329 |
| 2012/0243445 A1 | 9/2012 | Umeda et al. | |
| 2013/0083753 A1* | 4/2013 | Lee | H04W 72/0453 370/329 |
| 2013/0163532 A1 | 6/2013 | Anderson et al. | |

FOREIGN PATENT DOCUMENTS

| | | |
|---|---|---|
| WO | 2011043395 A1 | 4/2011 |
| WO | 2013049768 A1 | 4/2013 |

OTHER PUBLICATIONS

Written Opinion of the International Searching Authority issued in corresponding application No. PCT/JP2014/073884 dated Dec. 9, 2014 (6 pages).

3GPP TR 36.388 V12.0.0, "3rd Generation Partnership Project; Technical Specification Group Radio Access Network; Study on provision of low-cost Machine-Type Communications (MTC) User Equipments (UEs) based on LTE (Release 12)", Jun. 2013 (55 pages).

NEC Group, "Downlink cross-carrier control structure for LTE-Advanced"; 3GPP TSG-RAN WG1 Meeting #59, R1-094727; Jeju, Korea, Nov. 9-13, 2009 (3 pages).

Huawei, HiSilicon, CMCC, "Recommendation for bandwidth reduction", 3GPP TSG RAN WG1 meeting #68bis, R1-121708; Jeju, Korea, Mar. 26-30, 2012 (6 pages).

Office Action issued in the counterpart Japanese Patent Application No. 2013-199188, dated Jul. 18, 2017 (9 pages).

* cited by examiner

| TRANSMISSION MODE | DCI FORMAT TO DETECT |
|---|---|
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Closed-loop spatial multiplexing | DCI 0/1A, DCI 2 |
| 5. Multi-user MIMO | DCI 0/1A, DCI 1D |
| 6. Closed-loop Rank=1 precoding | DCI 0/1A, DCI 1B |
| 7. Single-antenna port; port 5 | DCI 0/1A, DCI 1 |
| 8. Dual-layer transmission using DM-RS | DCI 0/1A, DCI 2B |
| 9. Multi-layer transmission using DM-RS | DCI 0/1A, DCI 2C |

FIG.1

| RA FIELD ($f(N_{RB}^{DL})$ or $f(N_{RB}^{UL})$ bit) | MCS (5bit) | TPC (2bit) | HPN (3bit) | RV (2bit) | NDI | ... | CRC (16bit) |

FIG.3

|  | DCI 1A | DCI 1B | DCI 1D | DCI 2 | DCI 2A | DCI 2B | DCI 2C |
| --- | --- | --- | --- | --- | --- | --- | --- |
| SIZE (6 RBs) [bit] | 20 | 22 | 22 | 34 | 28 | 28 | 30 |
| SIZE (100 RBs) [bit] | 28 | 30 | 30 | 54 | 48 | 48 | 50 |
| UNNECESSARY OVERHEAD [bit] | 8 | 8 | 8 | 20 | 20 | 20 | 20 |

| RA FIELD ($f(N_{RB}^{PDSCH})$ or $f(N_{RB}^{PUSCH})$ bit) | MCS (5bit) | TPC (2bit) | ... | RV (2bit) | NDI | ... | CRC (16bit) |

FIG.6B

| MCS (5bit) | TPC (2bit) | ... | RV (2bit) | NDI | ... | CRC (16bit) |

FIG.8A

| FLAG | RA FIELD ($RA^{DL}$ bit) | MCS (5bit) | TPC (2bit) | HPN (3bit) | RV (2bit) | NDI | SRS | 0 | CRC (16bit) |

FIG.8B

| FLAG | RA FIELD ($RA^{UL}$ bit) | MCS (5bit) | TPC (2bit) | OCC (3bit) | RV (2bit) | NDI | SRS | CSI (1or2bit) | CRC (16bit) |

| DCI SIZE METHOD | DCI 0 [bit] | DCI 1A [bit] | DCI 2A [bit] |
|---|---|---|---|
| CONVENTIONAL | 30 (1 bit flag) | 30 (2 bits padding, 1 bit flag) | 48 |
| EXAMPLE 1 | 30 (1 bit flag) | 30 (10 bits padding, 1 bit flag) | 28 |
| EXAMPLE 1' | 30 (1 bit flag) | 30 (15 bits padding, 1 bit flag) | 22 |
| EXAMPLES 2-1/2-2 | 22 (1 bit flag) | 22 (2 bits padding, 1 bit flag) | 28 |
| EXAMPLES 2-1'/2-2' | 17 (1 bit flag) | 17 (2 bits padding, 1 bit flag) | 22 |
| EXAMPLE 3 | 30 (1 bit flag) | 19 | 30 (1 bit flag, 1 bit padding) |
| EXAMPLE 3' | 29 | 23 (7 bits padding, 1 bit flag) | 23 (1 bit flag) |

FIG.14

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1). Also, successor systems of LTE (referred to as, for example, "LTE-advanced" (hereinafter referred to as "LTE-A"), "FRA" (Future Radio Access) and so on) are under study for the purpose of achieving further broadbandization and increased speed beyond LTE.

Now, accompanying the cost reduction of communication apparatuses in recent years, active development of techniques pertaining to machine-to-machine communication (M2M), in which apparatuses connected to a network communicate with each other without involving people, is ongoing. In particular, of all M2M, 3GPP (Third Generation Partnership Project) is promoting standardization with respect to optimization of MTC (Machine-Type Communication), as a cellular system for machine-to-machine communication (see non-patent literature 1). MTC terminals are being studied for use in a wide range of fields, such as, for example, electric (gas) meters, vending machines, vehicles and other industrial equipment.

CITATION LIST

Non-Patent Literature

Non-Patent Literature 1: 3GPP TS 36.888 "Study on Provision of Low-Cost Machine-Type Communications (MTC) User Equipments (UEs) based on LTE (Release 12)"

SUMMARY OF INVENTION

Technical Problem

Of all MTC terminals, the demand for low-cost MTC terminals (low-cost MTC UEs), which can be implemented in simple hardware structures, is increasing for their cost and improvement of cellular system coverage areas. As for the reduction of the cost of MTC terminals, a study is in progress to achieve this by employing a structure in which the bandwidth for use for a physical downlink shared channel (PDSCH) is made narrower than the system bandwidth—that is, limited to be narrower than that for regular terminals. However, conventional communication systems do not presume a structure in which the system bandwidth and the bandwidth of a shared channel are different. Consequently, there is a problem that, if conventional control signals to presume that the system bandwidth and the shared channel bandwidth are the same are used, unnecessary communication overhead is produced in low-cost MTC terminals, and it becomes difficult to build a desirable cellular system.

The present invention has been made in view of the above, and it is therefore an object of the present invention to provide a radio base station, a user terminal and a radio communication method, which can reduce the overhead pertaining to control signals in a communication system where the bandwidth of a physical downlink shared channel (PDSCH) is narrower than the system bandwidth.

Solution to Problem

The radio base station of the present invention has a resource allocation section that allocates a physical downlink shared channel to a predetermined narrow band in a downlink system bandwidth, for a user terminal, and a downlink control information generating section that generates downlink control information to report to the user terminal, and, in this radio base station, the downlink control information generating section determines the size of a field pertaining to resource allocation information, included in downlink control information related to the physical downlink shared channel, based on the narrow band where the physical downlink shared channel is allocated.

Advantageous Effects of Invention

According to the present invention, it is possible to reduce communication overhead in a communication system in which the bandwidth of a physical downlink shared channel (PDSCH) is narrower than the system bandwidth.

BRIEF DESCRIPTION OF DRAWINGS

FIG. 1 is a diagram to show the relationships between transmission modes of a radio base station and DCI formats to be detected by a user terminal;

FIG. 3 is diagram to explain a detailed structure of DCI formats 0/1A;

FIG. 5 is a diagram to show examples of DCI format sizes and communication overhead when the field to pertain to resource allocation information depends on the system bandwidth;

FIG. 6 provides diagrams to explain detailed structures of DCI formats 0/1A according to examples 1/1' of the present embodiment;

FIG. 8 provides diagrams to explain typical structures of DCIs 0/1A;

FIG. 14 is a diagram to explain DCI format sizes according to each example of the present embodiment;

DESCRIPTION OF EMBODIMENTS

Before describing the present embodiment, problems with existing communication systems, which are to be solved by the present invention, will be described. Although the LTE system will be described as an example below, obviously, the same problems exist with the LTE-A system, the FRA system and others as well.

In the LTE system, the mapping of PDCCHs to radio resource elements assumes a predetermined structure in order to allow simple and efficient processing of control channels in user terminals. In this structure, based on a set of 36 resource elements, referred to as a "control channel element (CCE)," downlink control information (DCI) is formed with one or a plurality of CCEs. DCI is defined in a plurality of formats, depending on the contents of reports sent from a base station to a user terminal. The user terminal needs to monitor the combinations of CCEs, which are referred to as "search spaces," in order to detect DCI formats.

Since low-cost MTC terminals have simple structures, uplink MIMO (Multi Input Multi Output) transmission is not used. In this case, DCI format 0 (DCI 0), DCI format 1A (DCI 1A) and one more different DCI format (hereinafter referred to as "DCI X") are the DCI formats which the user terminal should detect. FIG. 1 shows the relationships between the transmission modes of the radio base station and the DCI formats to be detected by the user terminal. As shown in FIG. 1, DCI X depends upon the transmission mode of the radio base station.

Figure 2:
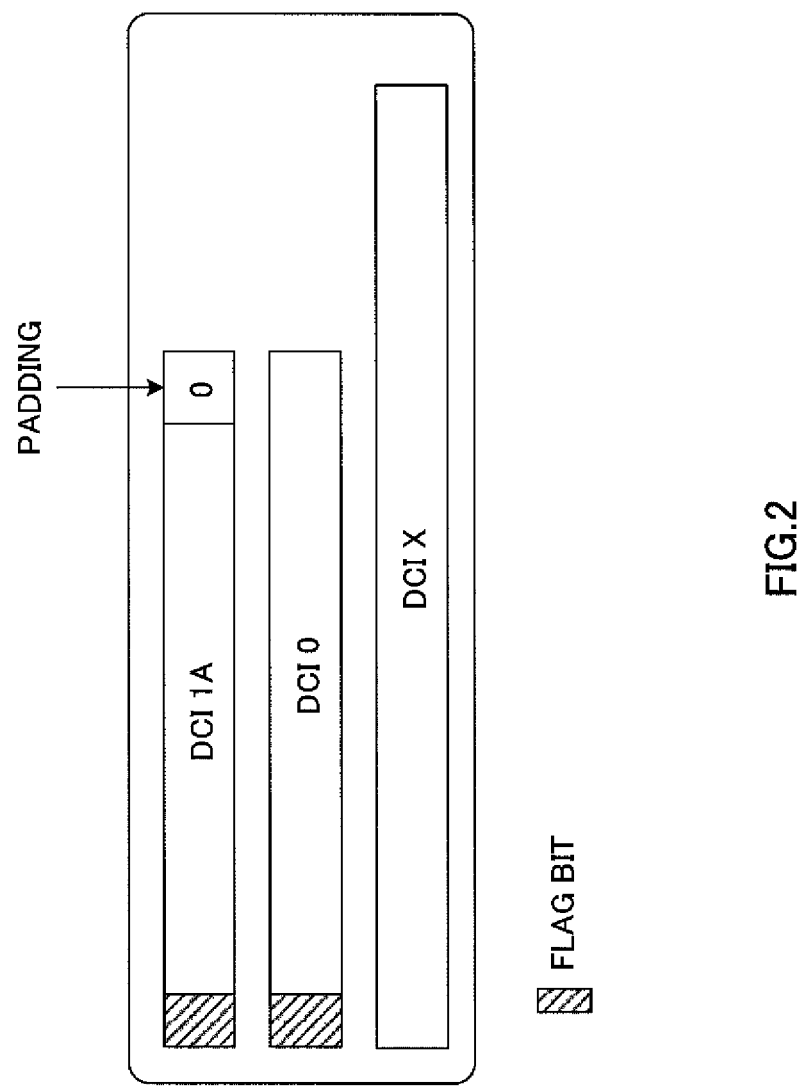
FIG. 2 is a diagram to explain the sizes of DCI formats to be detected by a user terminal.

Also, in the LTE system, in order to reduce the maximum number of times a user terminal tries blind detection per subframe, DCI 0 and DCI 1A are structured to be the same message size, and one-bit flags are provided for distinction. FIG. 2 is a diagram to explain the sizes of the DCI formats which the user terminal should detect. As shown in FIG. 2, padding with a "0" is applied in order to coordinate the message size between DCI 1A and DCI 0.

FIG. 3 shows a diagram to explain a detailed structure of DCIs 0/1A. The "RA field" (resource allocation field) in FIG. 3 is the field to pertain to resource allocation information of a physical uplink shared channel (PUSCH) in DCI 0, and is the filed to pertain to resource allocation information of the PDSCH in DCI 1A. To be more specific, the RA field contains information related to the allocation of RBs (resource blocks). The sizes of the RA field changes depending on the uplink/downlink system bandwidth, and can be represented as a function of the system bandwidth by one of expressions 1 and 2. That is, DCIs 0/1A change their size depending on the system bandwidth.

Here, $N_{RB}^{DL}$ is the downlink system bandwidth, $N_{RB}^{UL}$ is the uplink system bandwidth, and $f(x)$ is the weak monotonically increasing function with respect to x.

Figure 4:
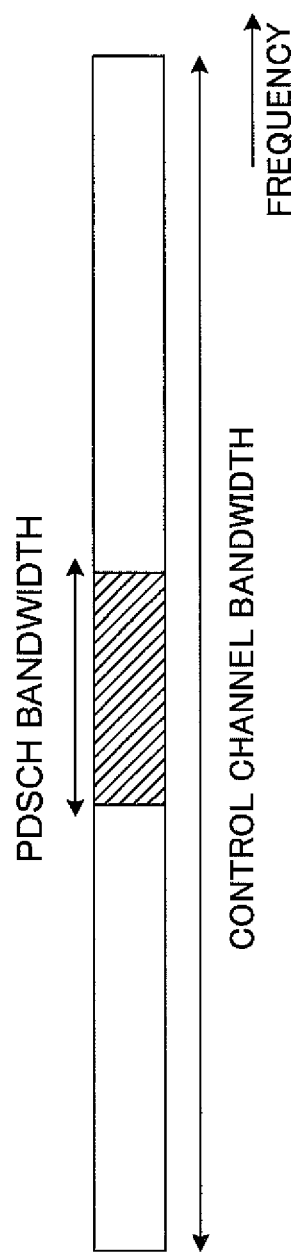
FIG. 4 is a diagram to show examples of PDSCH and PDCCH bandwidths to be allocated to low-cost MTC terminals.

Now, a structure is under study to reduce the bandwidth of the PDSCH to 1.4 MHz (six RBs) in low-cost MTC terminals, and make the bandwidth of a downlink control channel (PDCCH) and an uplink channel the same as that of regular LTE terminals. FIG. 4 shows examples of PDSCH and PDCCH bandwidths to be allocated to low-cost MTC terminals. In this structure to make the bandwidth of the PDSCH narrower than the system bandwidth, two measures are under study.

The first measure is "dynamic configuration." In dynamic configuration, the frequency in RF (Radio Frequency) where the reduced bandwidth is placed, and in which band in this reduced bandwidth the PDSCH is allocated need to be reported.

The second measure is "fixed/semi-static/predefined configuration." In fixed/semi-static/predefined configuration, only in which band in the reduced bandwidth the PDSCH is allocated needs to be reported, so that this is more suitable for low-cost MTC terminals. However, when fixed/semi-static/predefined configuration is employed, there is a problem that the size of DCIs 0/1A depends on the system bandwidth.

FIG. 5 is a diagram to show examples of DCI format sizes and communication overhead when the field pertaining to resource allocation information depends upon the system bandwidth. In FIG. 5, the row "Size (6 RBs)" shows the size of each DCI format when the system bandwidth is 1.4 MHz (6 RBs), and the row "Size (100 RBs)" shows the size of each DCI format when the system bandwidth is 20 MHz (100 RBs). Here, assume that the system bandwidth is 20 MHz and the actual PDSCH bandwidth is 1.4 MHz. In this case, although the sizes given in the row "Size (6 RBs)" in FIG. 5 provide sufficient DCI format sizes, it is still necessary to use the sizes given in the row "Size (100 RBs)," and therefore unnecessary communication overhead is produced in the DCI sizes (the row "Unnecessary Overhead" in FIG. 5). For example, in the event of DCI 1A, eight-bit communication overhead is produced. This communication overhead amounts to a significant load upon the system as the number of terminals increases, and, given that an enormous number of low-cost MTC terminals may be provided in the future, poses a problem that cannot be neglected.

So, the present inventors have come up with the idea that the communication overhead pertaining to control signals can be reduced by changing the RA field in DCI formats in a communication system in which the bandwidth of a physical downlink shared channel (PDSCH) is narrower than the system bandwidth (examples 1/1').

Now, the present embodiment will be described in detail below with reference to the accompanying drawings. Note that, although the following description will presume that user terminals are low-cost MTC terminals, this is by no means limiting.

FIG. 6 shows detailed structures of DCI formats 0/1A according to examples 1 and 1'. FIG. 6A shows the structure of DCIs 0/1A according to example 1. In example 1, the RA field is determined based on the bandwidth allocated to the PDSCH or the PUSCH, not the system bandwidth. In this case, as shown in FIG. 6A, the size of the RA field is represented by expression 3 or 4, and is reduced from the original size represented by expression 1 or 2.

[Expression 1]

$$f(N_{RB}^{DL}) \quad \text{(Expression 1)}$$

$$f(N_{RB}^{UL}) \quad \text{(Expression 2)}$$

[Expression 2]

$$f(N_{RB}^{PDSCH}) \quad \text{(Expression 3)}$$

$$f(N_{RB}^{PUSCH}) \quad \text{(Expression 4)}$$

Here, $N_{RB}^{PDSCH}$ is the bandwidth of the PDSCH, and $N_{RB}^{PUSCH}$ is the bandwidth of the PUSCH.

FIG. 6B shows the structure of DCIs 0/1A according to example 1'. Example 1' assumes a structure to allocate the PDSCH/PUSCH to the whole of the reduced bandwidth, so that the RA field size is made 0. That is, the RA field is not included (that is, removed) in the DCI formats. In this case, as shown in FIG. 6B, the RA field becomes 0 bit, so that the communication overhead pertaining to DCI can be reduced significantly.

Figure 7:
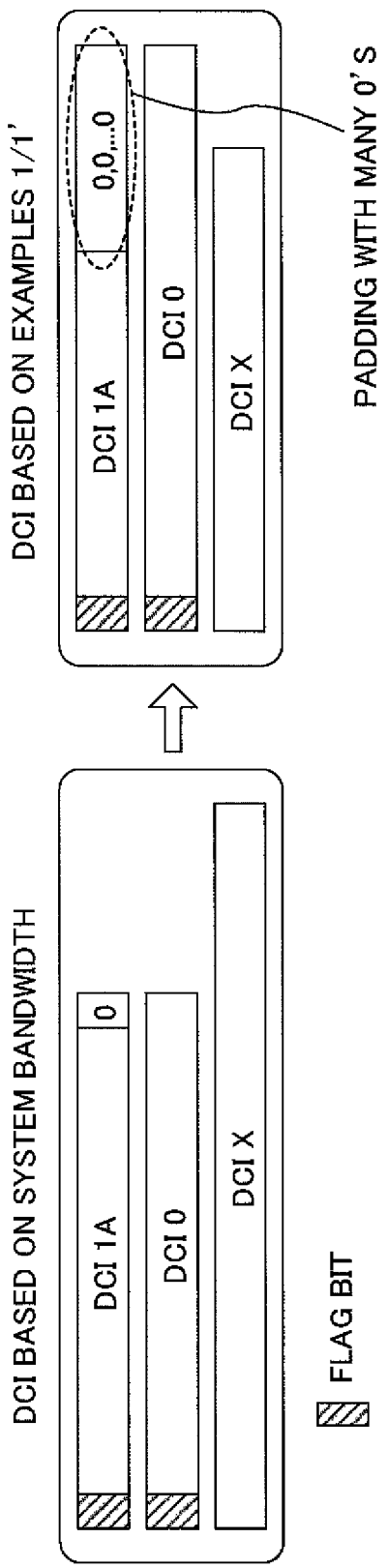
FIG. 7 is a diagram to explain zero padding according to examples 1/1' of the present embodiment.

In the above-described structures of examples 1 and 1', the size of the DCI format can be reduced significantly in accordance with the reduction of the shared channel transmission bandwidth. Meanwhile, from the perspective of reducing the number of times to detect blind decoding, it is preferable to make a plurality of DCI formats the same size. To be more specific, when making DCI 1A the same message size as DCI 0, padding is applied with many zeroes, in order to make DCI 1A, in which the size of the RA field is reduced in accordance with the bandwidth of the PDSCH, match the size of DCI 0 (FIG. 7). Consequently, with examples 1 and 1', cases might occur where the sizes of DCI formats cannot be necessarily reduced significantly.

A specific example of the case where, in examples 1/1', the size of DCI formats cannot be reduced significantly will be described with reference to FIG. 8. FIGS. 8A and 8B show typical structures of DCI 1A (downlink scheduling grant, or "DL grant") and DCI 0 (uplink scheduling grant, or "UL grant"), which are used normally in the LTE system. The sizes (in bit units) of the RA fields of FIGS. 8A and 8B are represented by expressions 5 and 6, respectively. In the existing LTE system, the uplink and downlink system bandwidths are equal, so that expressions 5 and 6 are equal.

[Expression 3]

$$RA^{DL} = \left\lceil \log_2 \frac{N_{RB}^{DL}(N_{RB}^{DL}+1)}{2} \right\rceil \quad \text{(Expression 5)}$$

$$RA^{UL} = \left\lceil \log_2 \frac{N_{RB}^{UL}(N_{RB}^{UL}+1)}{2} \right\rceil \quad \text{(Expression 6)}$$

Here, $\lceil x \rceil$ is the minimum integer equal to or above the real number x.

Meanwhile, if examples 1 and 1' are applied, the size of the RA field in DCI 1A is represented by expressions 5-1 and 5-2, respectively.

[Expression 4]

$$RA^{DL} = \left\lceil \log_2 \frac{N_{RB}^{PDSCH}(N_{RB}^{PDSCH}+1)}{2} \right\rceil \quad \text{(Expression 5-1)}$$

$$RA^{DL} = 0 \quad \text{(Expression 5-2)}$$

As described above, for low-cost MTC terminals, a study is in progress to make only the PDSCH bandwidth 1.4 MHz (6 RBs). Here, for example, when the bandwidth of the PUSCH is 20 MHz (100 RBs) and the same as the system bandwidth, the sizes of the RA fields when examples 1 and 1' of the present embodiment are applied, are represented by expressions 7 and 8, based on expressions 5-1, 5-2 and 6.

[Expression 5]

$$RA^{DL} = \left\lceil \log_2 \frac{6*(6+1)}{2} \right\rceil = 5[\text{bit}], \quad \text{(Expression 7)}$$

$$RA^{UL} = \left\lceil \log_2 \frac{100*(100+1)}{2} \right\rceil = 13[\text{bit}]$$

$$RA^{DL} = 0[\text{bit}], \quad \text{(Expression 8)}$$

$$RA^{UL} = \left\lceil \log_2 \frac{100*(100+1)}{2} \right\rceil = 13[\text{bit}]$$

When making DCI 1A the same message size as DCI 0 for blind decoding, zero padding needs to be applied with additional 8 bits in example 1, and with additional 13 bits in example 1', and therefore it is not possible to reduce the size of the DCI formats effectively. That is, when examples 1/1' are employed, the sizes of DCI formats cannot be reduced effectively if the PDSCH and PUSCH bandwidths are significantly different.

So, the present inventors have furthermore come up with the idea that, by employing a structure in which, in addition to the bandwidth of the PDSCH, the bandwidth of the PUSCH is also made narrow, and reducing the size of the RA field in DCI 0, it is possible to reduce communication overhead adequately even when the sizes of DCIs 0/1A are made equal (examples 2/2').

Also, the present inventors have furthermore come up with the idea that communication overhead can be reduced adequately by not limiting the DCI formats to make the same size for blind decoding to the combination of DCIs 0/1A, and by forming the DCI formats to make the same size for blind decoding with the combination of DCI to require padding the least (examples 3/3').

Note that examples 2 and 3 are based on example 1, and the size of the RA field is determined based on the bandwidth of the PUSCH/PDSCH. Also, examples 2' and 3' are based on example 1', and the size of the RA field is 0. Now, although examples 2 and 3 will be described in detail below with reference to the accompanying drawings, the same holds with example 2' and 3'.

Example 2

Figure 9:
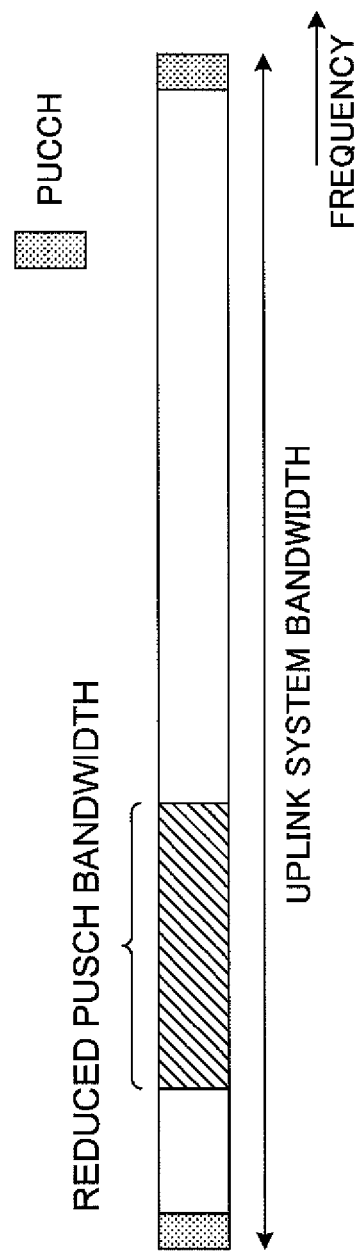
FIG. 9 is a diagram to show examples of PUSCH and PUCCH bandwidths to be allocated to user terminals according to example 2 of the present embodiment.

Example 2 limits not only the bandwidth of the PDSCH, but also the bandwidth of the PUSCH as well, to be narrower than the system bandwidth. FIG. 9 shows the bandwidths of the PUSCH and the PUCCH to allocate to a user terminal. In example 2, the PUCCH resources are placed apart, so that the frequency diversity gain is large compared to the scheme to make the system bandwidth itself narrow. Also, example 2 can be furthermore divided into two, depending on the method the user terminal acquires information related to the reduced bandwidth of the PUSCH. The first is the method of sending report from a radio base station, through higher layer signaling (for example, RRC (Radio Resource Control) signaling) (example 2-1). The second is the method of determining the resources of the reduced bandwidth of the PUSCH in the user terminal, in accordance with predetermined rules which the user terminal and the radio base station recognize in common (example 2-2). Note that, when "example 2" is mentioned in the following description, this collectively refers to example 2-1 and 2-2.

Example 2-1

Figure 10:
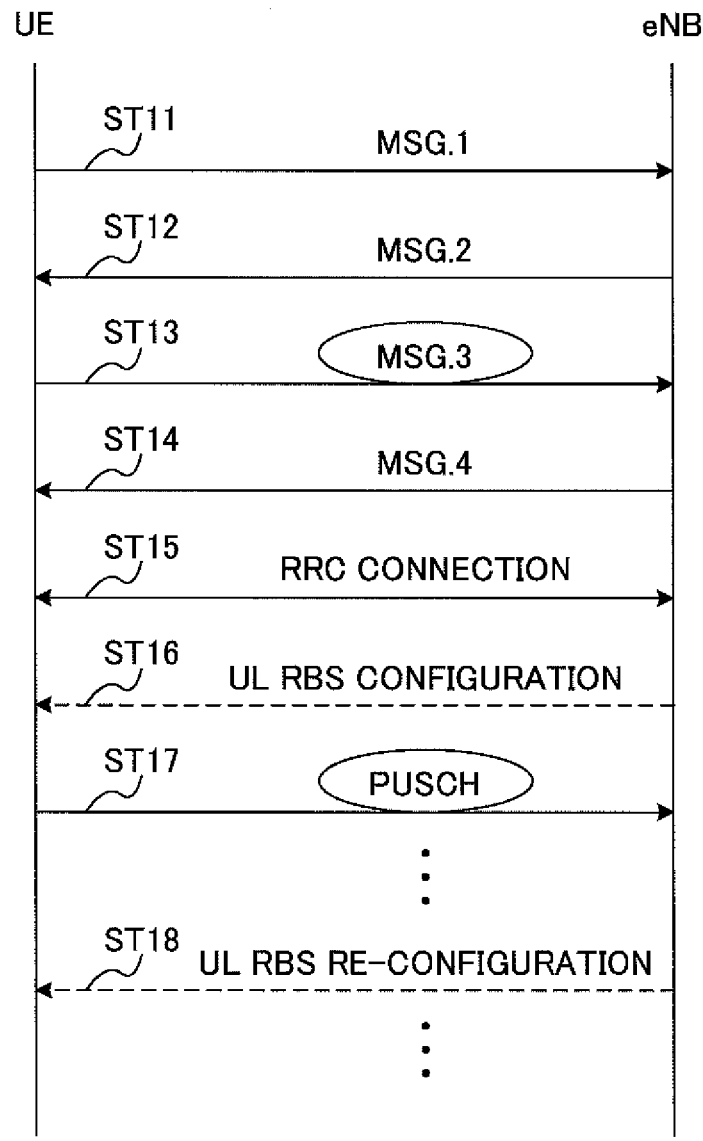
FIG. 10 is a diagram to explain an operation sequence pertaining to random access procedures by a radio base station and a user terminal according to examples 2-1/2-1' of the present embodiment.

FIG. 10 is a diagram to explain an operation sequence pertaining to random access procedures in a radio base station and a user terminal according to example 2-1. In the initial state, the user terminal has not established RRC connection with the radio base station, and therefore the user terminal first transmits a signal (Msg. 1), which is referred to as a "random access preamble (RA preamble)," to the radio base station via a physical random access channel (PRACH) (step ST11).

The radio base station, upon detecting that an RA preamble has been received, transmits a response signal (RA response, or "Msg. 2") to the user terminal (step ST12). Information to be contained in the RA response includes the index number of the detected preamble, a C-RNTI (Cell-Radio Network Temporary Identifier) as a user terminal identifier, transmission timing information (TA command), a UL grant and so on. Note that the C-RNTI to be contained in the RA response may be a temporary C-RNTI. Also, after step ST12, if the user terminal is unable to receive an RA response, the radio base station may return to step ST11 and retransmits the RA preamble by increasing the transmission power (power ramping).

The user terminal, upon receiving an RA response, transmits a higher layer control signal (Msg. 3) containing the C-RNTI and so on, by using radio resources based on the transmission timing reported in the RA response (step ST13). In step ST13, a band that is stipulated in advance is used as the bandwidth of the PUSCH. The stipulated band is a band which the radio base station and the user terminal recognize in common as the band to use for uplink signal transmission before RRC connection is established, and may be, for example, six RBs in the center of the system bandwidth.

The radio base station, upon receiving the control information, reports control information (Msg. 4) for RRC connection or re-connection to the user terminal (step ST14). In this case, to allow the user terminal to detect a signal collision, the control signal transmitted from the user terminal is also included and transmitted from the radio base station. After that, RRC connection or re-connection is established between the user terminal and the radio base station (step ST15).

Once RRC connection is established, the radio base station reports information related to the reduced PUSCH bandwidth to the user terminal through RRC signaling (step ST16). Here, the PUSCH bandwidth indicated in this report is preferably six consecutive RBs. Also, the information that is reported through RRC signaling may preferably be only the index number of the top RB in the PUSCH bandwidth (the RB to include the upper end or the lower end of the PUSCH bandwidth).

When transmitting a signal in the PUSCH, the user terminal allocates and transmits the signal in part or the whole of the resource blocks indicated by the bandwidth-related information that is reported (step ST17).

Note that the radio base station can report information about the reduced PUSCH bandwidth to the user terminal as appropriate through RRC signaling, and change the configuration (step ST18).

According to the structure of example 2-1, the bandwidth of the PUSCH can be reduced adequately, so that, in the reduction of DCI sizes shown with examples 1/1', it is possible to remove unnecessary padding, and reduce communication overhead adequately.

Example 2-2

Figure 11:
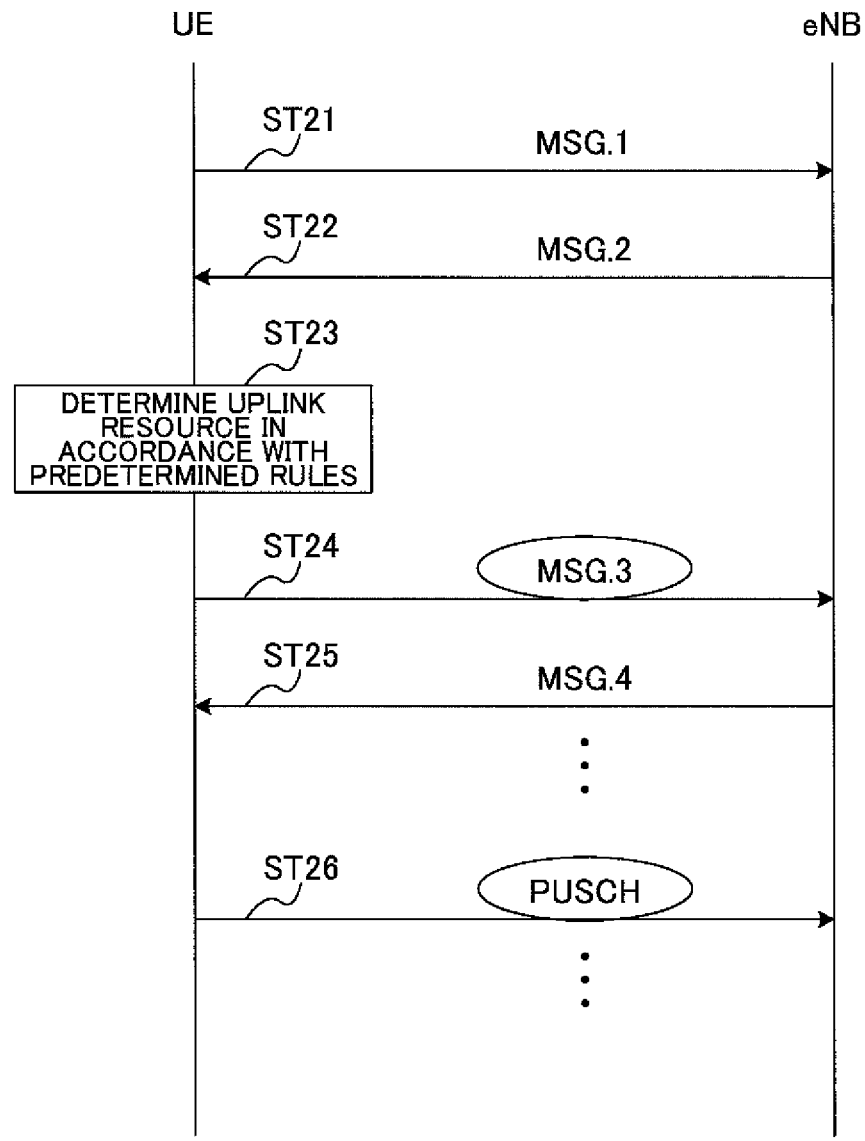
FIG. 11 is a diagram to explain an operation sequence pertaining to random access procedures by a radio base station and a user terminal according to examples 2-2/2-2' of the present embodiment.

FIG. 11 is a diagram to explain an operation sequence pertaining to random access procedures in a radio base station and a user terminal according to example 2-2. Steps ST21, 22, 24, 25 and 26 in FIG. 11 execute the same processes as in steps ST11, 12, 13, 14 and 17 of FIG. 10, so that only the differences of example 2-2 from example 2-1 will be described below. According to example 2-2, RRC signaling does not increase compared to conventional random access procedures.

The user terminal, upon receiving an RA response, determines the resource of the PUSCH in accordance with predetermined rules (step ST23). Here, the radio base station and the user terminal recognize the predetermined rules in common. Also, the bandwidth of the PUSCH to be determined in accordance with predetermined rules is preferably formed with six consecutive RBs. Also, it is preferable to determine only the index number of the top RB of the RBs where the PUSCH is placed, in accordance with predetermined rules. For example, when a C-RNTI is included in the RA response of step ST22, it is possible to determine the index number of the top RB in the bandwidth of the PUSCH by using that C-RNTI, as in expression 9. Also, as in expression 10, the RB index number may be made a fixed value.

[Expression 6]

$$\text{starting } RB \text{ index} = \text{C-RNTI} \bmod(N_{RB}^{UL}-6) \quad \text{(Expression 9)}$$

$$\text{starting } RB \text{ index} = \text{const.} \quad \text{(Expression 10)}$$

Here, the starting RB index is the index number of the top resource block where the six resource blocks may be arranged, the C-RNTI is the C-RNTI (Cell-Radio Network Temporary Identifier) or the temporary C-RNTI (Temporary C-RNTI), and $N_{RB}^{UL}$ is the uplink system bandwidth.

The user terminal transmits a higher layer control signal by using part or the whole of the determined PUSCH resource (step ST24). Also, when the user terminal transmits a signal in the PUSCH, again, the user terminal allocates the signal in part or the whole of the resource blocks included in the determined bandwidth (step ST26).

According to example 2-2, the bandwidth of the PUSCH can be reduced adequately, so that, in the reduction of DCI sizes shown with examples 1/1', it is possible to remove unnecessary padding, and reduce communication overhead adequately.

Example 3

Figure 12:
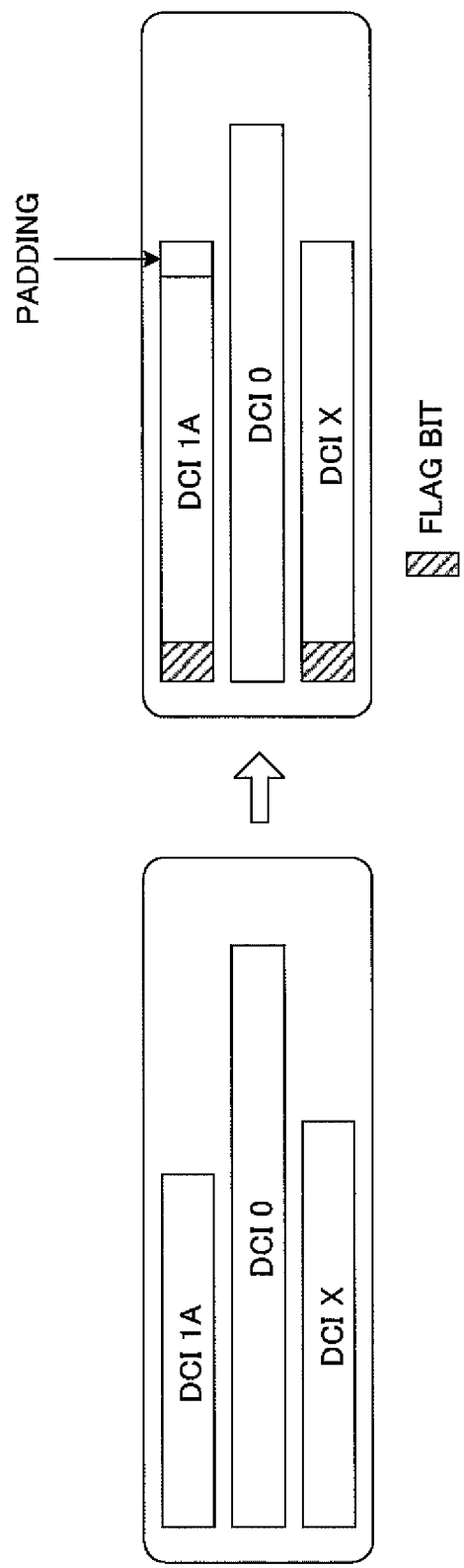
FIG. 12 is a conceptual diagram to explain example 3 of the present embodiment.

According to example 3, the DCI formats to make the same size are not limited to the combination of DCIs 0/1A, but are formed with the combination which uses the fewest padding bits. FIG. 12 shows a conceptual diagram to explain example 3. In FIG. 12, the difference in size between DCIs 1A/X is smaller than with the combination of the other DCIs, so that DCIs 1A/X are structured to be the same size. To be more specific, flag bits are added to DCIs 1A/X, and, in addition, DCI 1A, which has the smaller size between the two, is padded, so as to match with the size of DCI X. Here, the bits to pad need not be "0," and information to use in a predetermined process may be used as well. For example, the padding bits may be configured so as to be used in DCI error correction.

Figure 13:
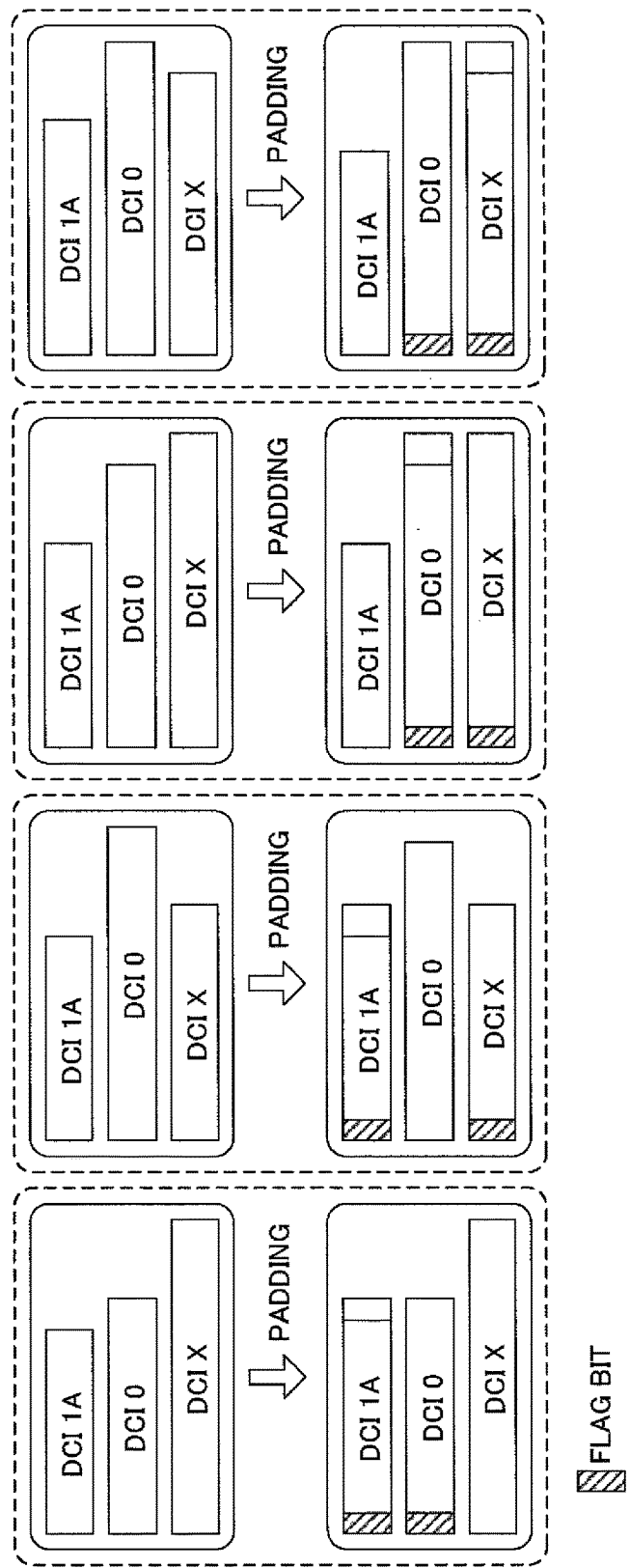
FIG. 13 provides diagrams to explain DCI structures according to example 3 of the present embodiment.

When the size of DCI 1A is smaller than the sizes of DCI 0 and DCI X, the four patterns of structures shown in FIG. 13 may be possible with example 3. FIG. 13A shows a case where DCIs 1A and 0 are the same size (case 1). In case 1, DCI 1A is padded. That is, case 1 is the same as conventional DCI formats. However, the bits to use for padding are not limited to "0," as mentioned earlier. A case where DCI 1A is 20 bits (to which example 1 has been applied), DCI 0 is 22 bits (uplink system bandwidth=6 RBs) and DCI X is 30 bits (DCI 2C) may show examples of the pre-padding DCIs in case 1 (the upper part in FIG. 13A).

FIG. 13B shows a case where DCIs 1A and X are made the same size (case 2). In case 2, DCI 1A is padded. A case where DCI 1A is 20 bits (to which example 1 has been applied), DCI 0 is 30 bits (uplink system bandwidth=100 RBs) and DCI X is 22 bits (DCIs 1B/1D (the number of transmitting antennas is 2)) may show examples of the pre-padding DCIs in case 2 (the upper part in FIG. 13B).

FIG. 13C shows a case where DCI 0 is smaller than DCI X and DCIs 0 and X are made the same size (case 3). In case 3, DCI 0 is padded. A case where DCI 1A is 20 bits (to which example 1 has been applied), DCI 0 is 29 bits (uplink system bandwidth=75 RBs) and DCI X is 30 bits (DCI 2C) may show examples of the pre-padding DCIs in case 3 (the upper part in FIG. 13C).

FIG. 13D shows a case where DCI 0 is bigger than DCI X and DCIs 0 and X are made the same size (case 4). In case 4, DCI X is padded. A case where DCI 1A is 20 bits (to which example 1 has been applied), DCI 0 is 30 bits (uplink system bandwidth=100 RBs) and DCI X is 28 bits (DCI 2A (the number of transmitting antennas is 2)) may show examples of the pre-padding DCIs in case 4 (the upper part in FIG. 13D).

According to the structure of example 3, two DCIs, with which blind decoding is possible, are determined to reduce the padding bits, so that, in the reduction of DCI sizes shown with examples 1/1', it is possible to remove unnecessary padding, and reduce communication overhead adequately.

Note that each example of the present embodiment is not only applicable to the PDCCH, but also is applicable to the EPDCCH (enhanced PDCCH). Also, each example of the present embodiment can be used for terminal-specific search spaces, especially in MTC terminals.

Advantages which each example of the present embodiment brings about will be described in detail below.

FIG. 14 shows DCI format sizes according to each example. In FIG. 14, DCI 2A is used as DCI X. As an object of comparison, a scheme in which the sizes of DCI formats depend on the system bandwidth and in which DCI 1A is subject to zero padding is shown together (hereinafter referred to as the "conventional scheme"). According to examples 1', 2' and 3', the RA field can be removed, making it clear that their sizes can be reduced compared to those of examples 1, 2 and 3, respectively. It is also clear that the padding bits of examples 1/1' are reduced in examples 2/2' and 3/3'. By this means, the PDCCH resource (for example, the number of CCEs) for achieving predetermined coding rates can be reduced. Also, in coverage enhancement, which is under study for introduction to MTC terminals, the repetition scheme (the scheme to improve the signal detection rate by repeating transmitting signals) is used, so that it is possible to reduce the number of repetitions for achieving predetermined coding rates.

Figure 15A:
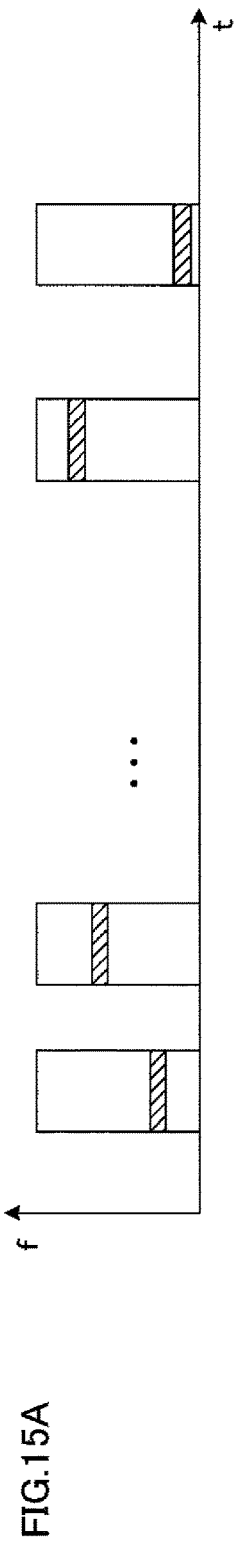
FIG. 15 provides diagrams to explain scheduling gain according to each example of the present embodiment.
Figure 15B:
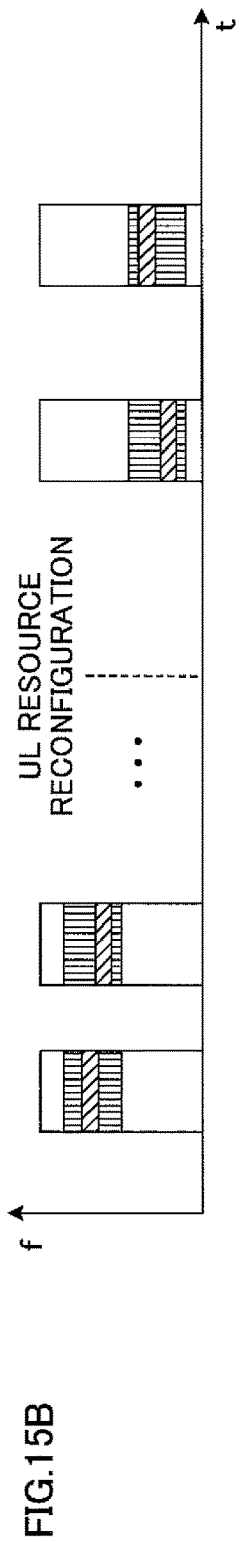
Figure 15C:
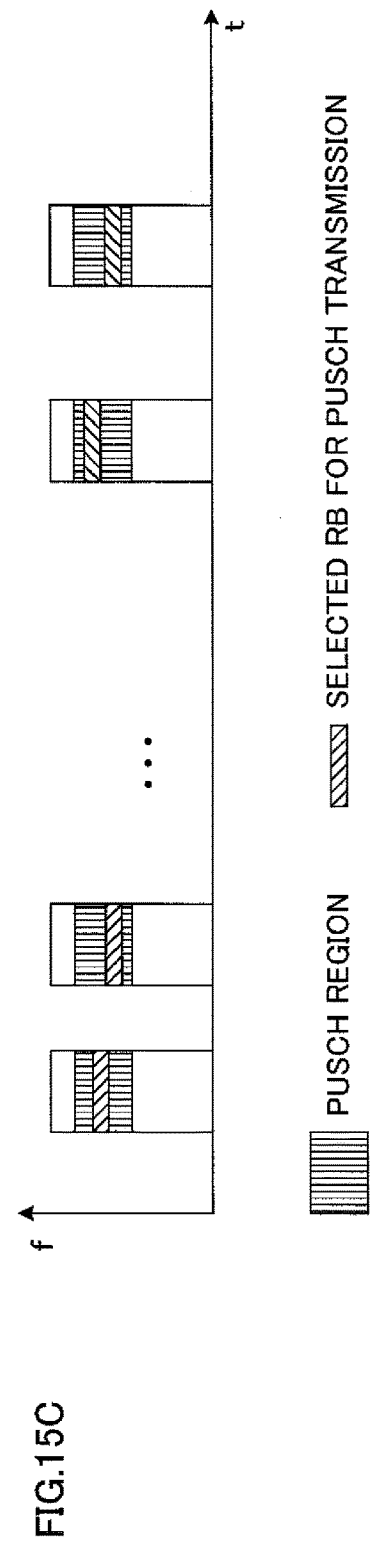

FIG. 15 provides diagrams to explain the scheduling gain of the PUSCH according to each example. In FIG. 15 the variations of the band for allocating the PUSCH over time in each example. FIG. 15A shows a case with examples 1/1' and 3/3'. In FIG. 15A, the scheduling gain is large because the resource allocated to the PUSCH is selected from the entire region of the system bandwidth. FIG. 15B shows a case with examples 2-1/2-1'. In FIG. 15B, the PUSCH resource is selected in the region reported through RRC signaling. Also, as shown with step ST18 of FIG. 10, when the reduced bandwidth of the PUSCH is re-configured, the region where the PUSCH can be allocated changes. Consequently, in FIG. 15B, the scheduling gain is a medium level. FIG. 15C shows a case with examples 2-2/2-2'. In FIG. 15C, unlike FIG. 15B, there is no variation because the bandwidth of the PUSCH is determined in accordance with predetermined rules. Consequently, the scheduling gain is small in FIG. 15C.

Figure 16A:
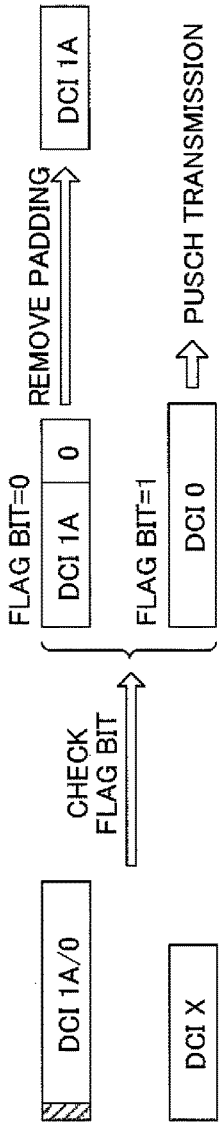
FIG. 16 provides diagrams to explain a DCI decoding process in a user terminal according to each example of the present embodiment.

FIG. 16 is diagram to explain the DCI decoding process in a user terminal according to each example. FIG. 16A shows the DCI decoding process according to examples 1/1'. In FIG. 16A, when DCIs are received, the flag bit needs to be checked for blind decoding, with DCIs 1A/0. When the flag bit is 0, the DCI is DCI 1A, so that the zero padding is removed and DCI 1A is provided. On the other hand, when the flag bit is 1, the DCI is DCI 0, so that PUSCH transmission is carried out after this.

Figure 16B:
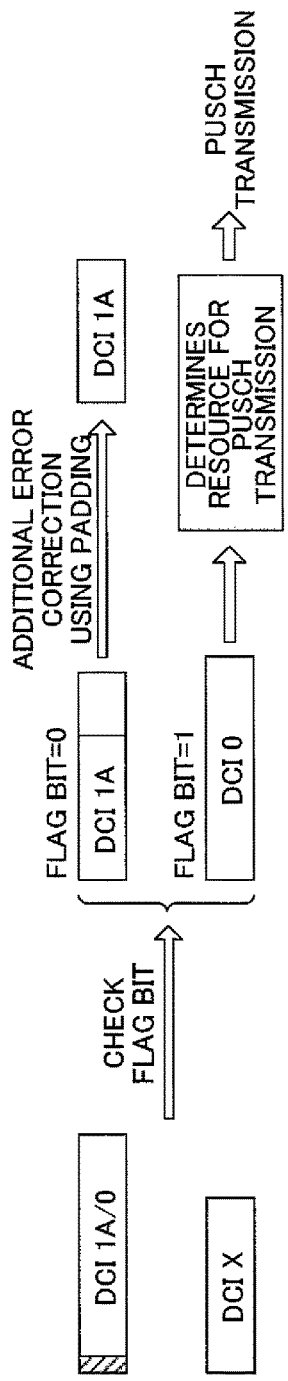

FIG. 16B shows the DCI decoding process according to examples 2/2'. In examples 2/2', upon PUSCH transmission, it is necessary to allocate resources within the range of the PUSCH bandwidth that is reported or determined in accordance with predetermined rules. Note that, when error correction is executed by using the padding bits of DCI 1A, this error correction process is necessary.

Figure 16C:
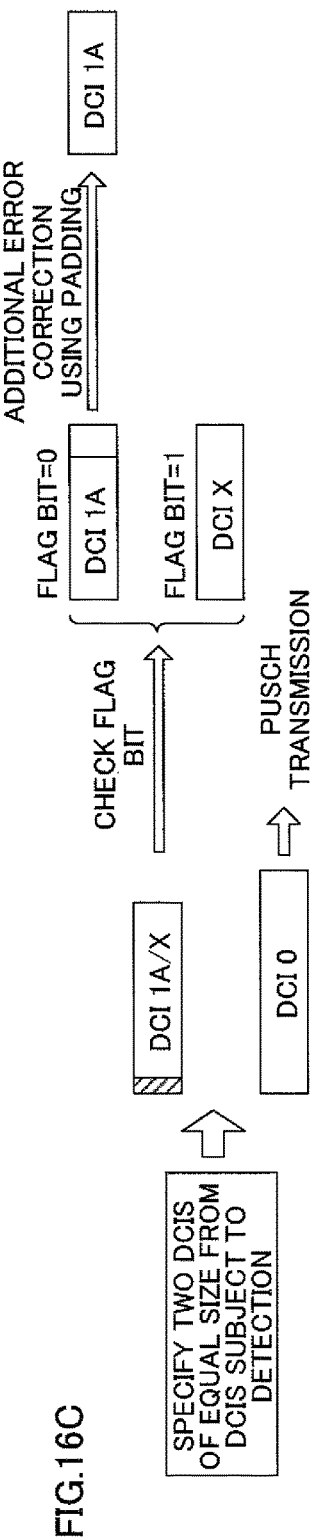

FIG. 16C shows the DCI decoding process according to examples 3/3'. Here, although an example of case 2 shown in FIG. 13B is shown here, the same holds with other cases as well. In examples 3/3', of the DCIs that are subject to detection, two DCIs of equal size need to be specified. Note that, when error correction is executed by using the padding bits of DCI 1A, this error correction process is necessary.

As described above, it is possible to select each example of the present embodiment depending on the DCI format to reduce, the performance requirements of user terminals and so on.

(Structures of Radio Base Station and User Terminal)

Figure 17:
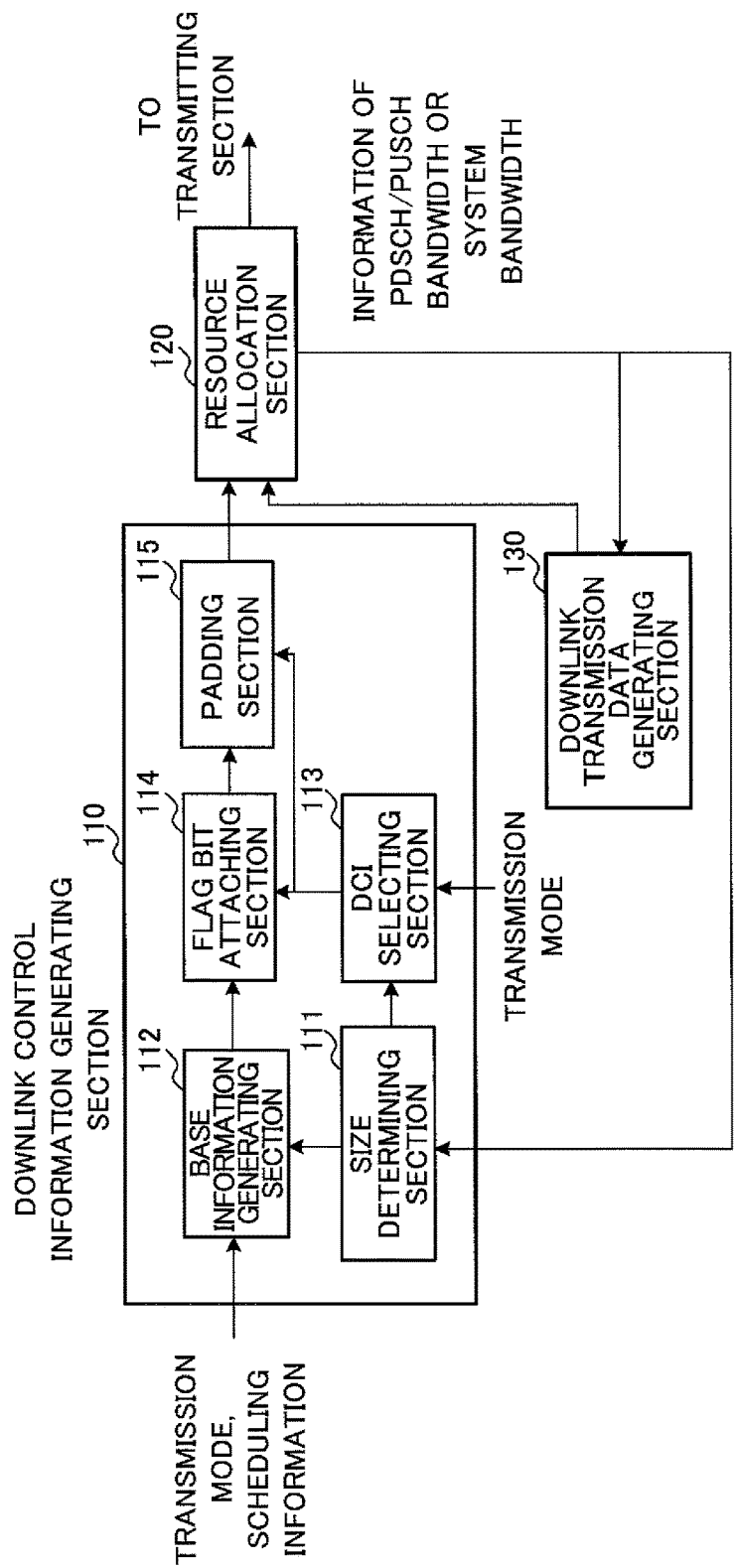
FIG. 17 is a block diagram to explain an example structure of a radio base station according to the present embodiment.
Figure 18:
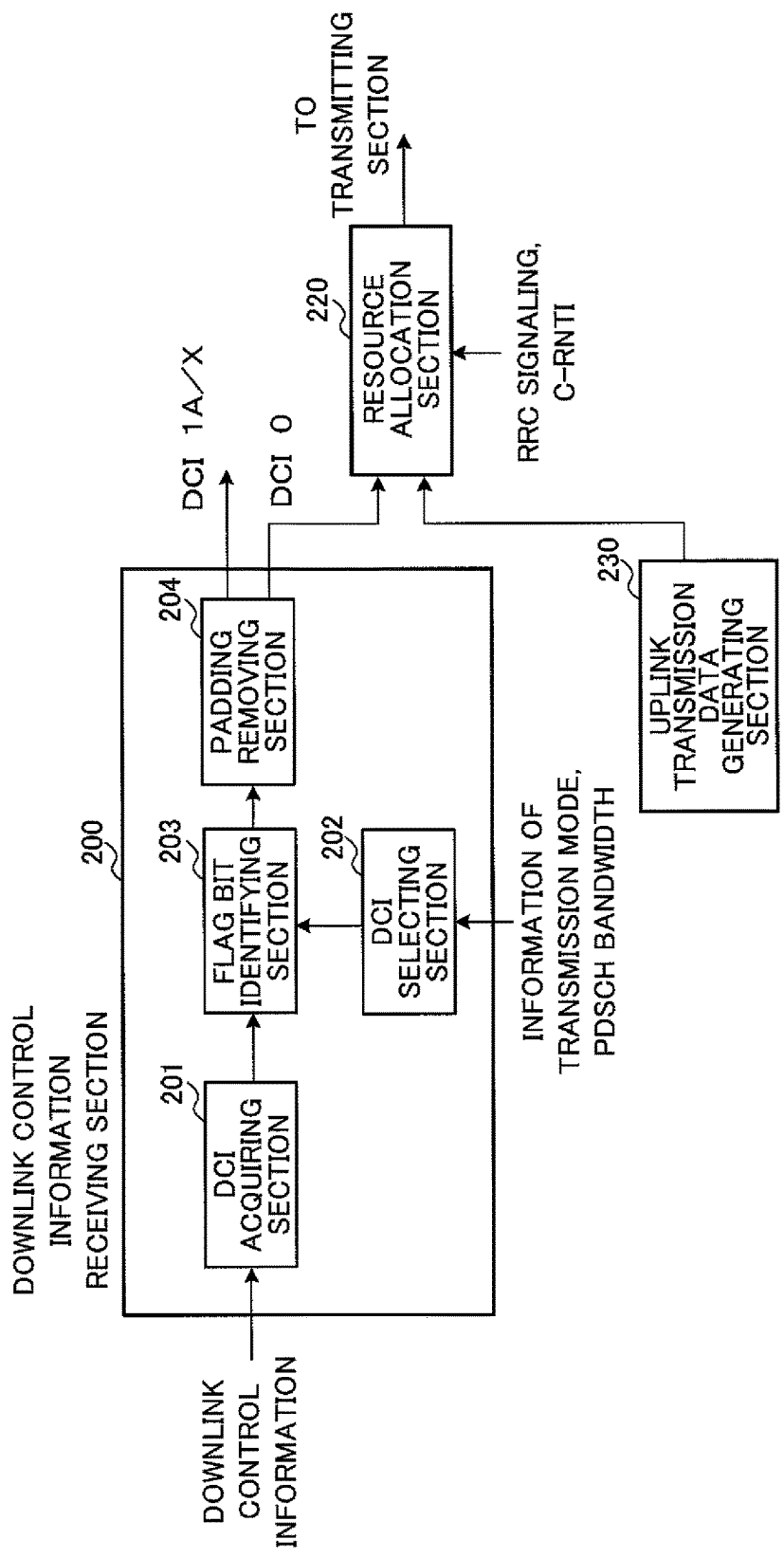
FIG. 18 is a block diagram to show an example structure of a user terminal according to the present embodiment.

Next, examples of the structures of a radio base station and a user terminal according to the present embodiment will be described. FIG. 17 is a block diagram to show an example structure of a radio base station. FIG. 18 is a block diagram to show an example structure of a user terminal. Note that the structures of the radio base station and the user terminal shown in FIG. 17 and FIG. 18 are simplified in order to explain characteristic parts of the present embodiment, but the radio base station and the user terminal have structures which normal radio base stations and user terminals have.

As shown in FIG. 17, the radio base station has a downlink control information generating section 110, a resource allocation section 120 and a downlink transmission data generating section 130.

The downlink control information generating section 110 generates user terminal-specific downlink control information (DCI), which is transmitted in the PDCCH or the EPDCCH. The downlink control information generated in the downlink control information generating section 110 is subjected to coding and modulation, and is output to the resource allocation section 120. The downlink control information generating section 110 includes a size determining section 111, a base information generating section 112, a DCI selecting section 113, a flag bit attaching section 114 and a padding section 115.

The size determining section 111 determines the size of the field included in the DCI formats and pertaining to resource allocation information based on the bandwidth of the PDSCH/PUSCH or the system bandwidth input from the resource allocation section 120, and outputs this to the base information generating section 112 and the DCI selecting section 113. To be more specific, with examples 1/3, the size determining section 111 determines the size of the RA field based on the bandwidth of the PDSCH in the event of DCIs 1A/X and based on the PUSCH or the system bandwidth in the event of DCI 0. Also, with example 2, the size determining section 111 determines the size of the RA field based on the bandwidth of the PDSCH in the event of DCIs 1A/X, and based on the bandwidth of the PUSCH to report to each user terminal in the event of DCI 0 (example 2-1), or based on a bandwidth of the PUSCH determined in accordance with predetermined rules (example 2-2). Furthermore, according to examples 1'/2'/3', the size of the RA field can be made 0.

The base information generating section 112 generates the base information to include in the downlink control information to be suitable for the DCI formats, and outputs this information to the flag bit attaching section 114. To be more specific, in accordance with the transmission mode, scheduling information and the size of the RA field input from the size determining section 111, the base information generating section 112 specifies the DCI to be generated, and generates the base information to be included in the specified DCI. Note that, assuming the DCI formats shown in FIG. 8, the base information here refers to the information excluding the flag bit, the padding bits and the CRC bits.

From a plurality of DCI formats that are identified from the transmission mode, the DCI selecting section 113 selects the two DCIs showing the least difference in terms of size, and reports these to the flag bit attaching section 114 and the padding section 115. Note that, in examples 1/1'/2/2', DCIs 0 and 1A may be selected as these two DCIs, on a fixed basis.

When the base information is input from the base information generating section 112, the flag bit attaching section 114 attaches flag bits for distinguishing between two DCIs to the two DCIs selected in the DCI selecting section 113, and outputs the resulting DCIs to the padding section 115. However, with examples 1/1'/2/2', it is also possible to attach flag bits to DCI 0 and 1A, without relying upon the DCI selecting section 113. Also, the flag bit attaching section 114 outputs DCIs to which the flag bit needs not be attached, to the padding section 115 on an as-is basis. Note that the flag bit is one bit here, but may be formed with multiple bits as well. Also, a structure to use a predetermined bit in the base information as a flag bit, and attach nothing in the flag bit attaching section 114 may be employed.

In the base information containing the flag bit input from the flag bit attaching section 114, the padding section 115 applies bit padding to the DCI of the smaller size reported from the DCI selecting section 113, and outputs the result to the resource allocation section 120. However, with examples 1/1'/2/2', bit padding is applied to DCI 1A, regardless of the DCI selecting section 113. Note that the padding bits can be simply "0" or "1," or bits that are generated in accordance with predetermined rules may be used, so as to use in error correction and so on the user terminal side.

The resource allocation section 120 allocates the signals given by encoding and modulating the control signals generated in the downlink control signal generating section 110, the data signals generated in the downlink transmission data generating section 130 and so on, to radio resources, and outputs these signals to the transmitting section. The signals that are output to the transmitting section are subjected to channel multiplexing, and, through various processes, transmitted to the user terminal as a downlink signal. Also, the resource allocation section 120 manages the allocation of radio resources with respect to the PDSCH/PUSCH. The resource allocation is performed based on the PDSCH/PUSCH bandwidths and the system bandwidth.

The downlink transmission data generating section 130 generates downlink transmission data for the user terminal. The downlink user data generated in the downlink transmission data generating section 130 is encoded and modulated, with higher control information, into downlink transmission data to be transmitted in the PDSCH, and output to the resource allocation section 120. In examples 2-1/2-1', the downlink transmission data generating section 130 may receive information related to the bandwidth of the PUSCH from the resource allocation section 120, and generate data for reporting this piece of information to the user terminal through RRC signaling.

Meanwhile, as shown in FIG. 18, the user terminal has a downlink control information receiving section 200, a resource allocation section 220 and an uplink transmission data generating section 230.

In the user terminal, the downlink signal transmitted from the radio base station is divided, through various receiving processes, into downlink control information, downlink transmission data (including higher control information) and so on. The downlink control information is input in the downlink control information receiving section 200. The downlink control information receiving section 200 includes a DCI acquiring section 201, a DCI selecting section 202, a flag bit identifying section 203 and a padding removing section 204.

First, the DCI acquiring section 201 acquires DCIs from the downlink control information that is input, and outputs the DCIs to the flag bit identifying section 203. At this time, it may be possible to apply error correction to the DCI payloads using CRC and so on.

The DCI selecting section 202 selects the two DCIs showing the least difference in size, among a plurality of DCI formats that are identified from the transmission mode. Here, information that is required to make selection, such as the transmission mode and the bandwidth of the PDSCH, may be reported from the radio base station in advance. Also, it is equally possible to learn from the size of the DCIs acquired, and make decisions as appropriate.

The flag bit identifying section 203 decides whether or not the DCIs that are input from the DCI acquiring section 201 are the DCIs selected in the DCI selecting section 202. If the DCIs are the DCIs selected in the DCI selecting section 202, the flag bit identifying section 203 removes the flag bits, and, if padding needs to be removed, outputs the DCIs to the padding removing section 204. Note that the flag bit may be configured to be implicitly linked with whether removal of padding is necessary/not necessary. For example, in the radio base station, if a DCI in which the flag bit is 0 is always subject to padding, the flag bit identifying section 203 does not have to decide whether removal of padding is necessary/unnecessary.

The padding removing section 204 removes the padding bits from the base information of the DCIs input from the flag bit identifying section 203, and outputs the results to an adequate destination. Here, if the DCIs are DCIs that do not require removal of padding, such as, for example, DCIs that were not selected in the DCI selecting section 202, the DCIs are output to an adequate destination as is. Note that error correction and so on may be applied by using the padding bits.

When a DCI received in the downlink control information receiving section 200 is DCI 0, the user terminal transmits data to the radio base station via the PUSCH with adequate timing, in accordance with the scheduling information.

The resource allocation section 220 allocates signals, given by encoding and modulating the data signals generated in the uplink transmission data generating section 230 and so on, to radio resources, and outputs these signals to the transmitting section. The signals output to the transmitting section are subjected to channel multiplexing, and, through various processes, transmitted to the radio base station as an uplink signal. Also, the resource allocation section 220 manages the allocation of radio resources with respect to the PUSCH, based on the PUSCH bandwidth and the system bandwidth. To be more specific, with examples 1/1'/3/3', RBs are selected from the system bandwidth and used in PUSCH transmission. Also, with examples 2-1/2-1', RBs are selected from the bandwidth of the PUSCH indicated in the RRC signaling report, and used in PUSCH transmission. Here, in examples 2-1/2-1', a band which the radio base station and the user terminal recognize in common is used for uplink signal transmission, until RRC connection is established and information related to the bandwidth of the PUSCH is reported through RRC signaling. Also, with examples 2-2/2-2', RBs are selected from the reduced PUSCH bandwidth in accordance with predetermined rules, and used in PUSCH transmission. For example, the bandwidth of the PUSCH may be calculated by using a C-RNTI reported from the radio base station in an RA response. In this case, the radio base station already knows the C-RNTI, so that, by sharing the method of calculation in common between the radio base station and the user terminal, the user terminal can calculate the bandwidth of the PUSCH, without having the PUSCH allocation band reported directly from the radio base station.

The uplink transmission data generating section 230 generates uplink transmission data for the radio base station. The uplink data generated in the uplink transmission data generating section 230 is encoded and modulated, with higher control information, into uplink transmission data to be transmitted in the PUSCH, and output to the resource allocation section 220.

Note that the present invention is by no means limited to the above embodiment and can be implemented in various modifications. For example, it is possible to adequately change the signaling method, the number of processing sections, the order of processes and so on in the above description as appropriate, without departing from the scope of the present invention, and implement the present invention. Besides, the present invention can be implemented with various changes, without departing from the scope of the present invention.

The disclosure of Japanese Patent Application No. 2013-199188, filed on Sep. 26, 2013, including the specification, drawings and abstract, is incorporated herein by reference in its entirety.

The invention claimed is:

1. A radio base station configured to communicate with a user terminal, comprising:
a processor that:
allocates a physical downlink shared channel to a given narrow band in a downlink system bandwidth, for the user terminal;
generates downlink control information to provide to the user terminal and determines a size of a field pertaining to resource allocation information included in downlink control information related to the physical downlink shared channel, based on the narrow band where the physical downlink shared channel is allocated;
determines, from a plurality of pieces of downlink control information, two pieces of downlink control information that show a minimum difference in size; and
applies bit padding to one of the two pieces of downlink control information to make the two pieces of downlink control information equal in size; and
a transmitter that transmits to the user terminal the two pieces of downlink control information.

2. The radio base station according to claim 1, wherein:
the processor allocates only a resource for a specific user terminal to a whole of the narrow band; and
the processor makes 0 the size of the field pertaining to the resource allocation information included in downlink control information to provide to the specific user terminal.

3. The radio base station according to claim 1, wherein the processor allocates a physical uplink shared channel to a given narrow band in an uplink system bandwidth, for the user terminal; and
the processor determines the size of the field pertaining to the resource allocation information included in downlink control information related to the physical uplink shared channel, based on the narrow band where the physical uplink shared channel is allocated.

4. The radio base station according to claim 3, wherein information related to the narrow band where the physical uplink shared channel is allocated is reported to the user terminal through higher layer signaling.

5. The radio base station according to claim 4, wherein the narrow band where the physical uplink shared channel is allocated is:
a band that is stipulated and that is recognized by the radio base station and the user terminal in common, when the user terminal does not receive the information related to the narrow band; and
a band that is indicated by the information related to the narrow band, when the user terminal receives the information related to the narrow band.

6. The radio base station according to claim 3, wherein the narrow band where the physical uplink shared channel is allocated is determined in accordance with a given rule that is shared between the user terminal and the radio base station in common.

7. The radio base station according to claim 6, wherein the narrow band where the physical uplink shared channel is allocated is formed with six consecutive resource blocks, and
an index number of a first resource block where the six resource blocks may be placed is determined by following expression 9:

$$\text{starting } RB \text{ index} = \text{C-RNTI} \bmod (N_{RB}^{UL} - 6) \qquad \text{(Expression 9)}$$

where the starting RB index is the index number of the first resource block where the six resource blocks may be placed, the C-RNTI is a C-RNTI (Cell-Radio Network Temporary Identifier) or a temporary C-RNTI (Temporary C-RNTI), and $N_{RB}^{UL}$ is an uplink system bandwidth.

8. The radio base station according to claim 2, wherein:
the processor allocates a physical uplink shared channel to a given narrow band in an uplink system bandwidth, for the user terminal; and the processor determines the size of the field pertaining to the resource allocation information included in downlink control information related to the physical uplink shared channel, based on the narrow band where the physical uplink shared channel is allocated.

9. A user terminal comprising:
a processor coupled to a memory, the processor acquires downlink control information; and
the processor distinguishes between two pieces of downlink control information based on a flag bit included in each of the two pieces of downlink control information,
wherein the processor determines a size of a field pertaining to resource allocation information included in downlink control information related to a physical downlink shared channel allocated to a given narrow band in a downlink system bandwidth, based on the narrow band where the physical downlink shared channel is allocated,
wherein the two pieces of downlink control information show a minimum difference in size among a plurality of pieces of downlink control information, and
wherein bit padding is applied to one of the two pieces of downlink control information to make the two pieces of downlink control information equal in size.

10. A radio communication method for a user terminal, comprising:
acquiring downlink control information;
distinguishing between two pieces of downlink control information based on a flag bit included in each of the two pieces of downlink control information; and
determining a size of a field pertaining to resource allocation information included in downlink control information related to a physical downlink shared channel allocated to a given narrow band in a downlink system bandwidth, based on the narrow band where the physical downlink shared channel is allocated,
wherein the two pieces of downlink control information show a minimum difference in size among a plurality of pieces of downlink control information, and
wherein bit padding is applied to one of the two pieces of downlink control information to make the two pieces of downlink control information equal in size.

* * * * *